United States Patent
Ashikhmin et al.

(10) Patent No.: US 7,860,044 B2
(45) Date of Patent: Dec. 28, 2010

(54) METHODS AND APPARATUS FOR PROVIDING SYNCHRONIZATION IN A MULTI-CHANNEL COMMUNICATION SYSTEM

(75) Inventors: Alexei E. Ashikhmin, Morristown, NJ (US); Hungkei Keith Chow, Livingston, NJ (US); Adriaan J. De Lind Van Wijngaarden, New Providence, NJ (US); Jan Willem Hellenthal, Ermelo (NL); Jean Gerardus Leonardus Jennen, Huizen (NL); Gerhard Guenter Theodor Kramer, Chatham, NJ (US); Carl Robert Posthuma, DuPage, IL (US); Harmanus van Tellingen, Naarden (NL); Philip Alfred Whiting, New Providence, NJ (US); Miroslav Zivkovic, 's-Gravenhage (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 116 days.

(21) Appl. No.: 12/130,253

(22) Filed: May 30, 2008

(65) Prior Publication Data

US 2009/0296865 A1    Dec. 3, 2009

(51) Int. Cl.
*H04B 7/204* (2006.01)
(52) U.S. Cl. ..................................... 370/319
(58) Field of Classification Search .................. None
See application file for complete search history.

(56) References Cited

U.S. PATENT DOCUMENTS

| | | | | |
|---|---|---|---|---|
| 4,477,895 A * | 10/1984 | Casper et al. | ............... | 370/228 |
| 6,707,829 B1 * | 3/2004 | Hanks et al. | ................ | 370/519 |
| 7,336,627 B1 * | 2/2008 | Hasegawa et al. | ........... | 370/282 |
| 7,539,208 B2 * | 5/2009 | Chapman et al. | ............ | 370/466 |
| 2003/0086362 A1 | 5/2003 | Hasegawa et al. | | |
| 2004/0004945 A1 * | 1/2004 | Monsen | ..................... | 370/328 |
| 2007/0081562 A1 * | 4/2007 | Ma | ............................ | 370/516 |
| 2008/0187009 A1 * | 8/2008 | Kim et al. | .................... | 370/517 |

OTHER PUBLICATIONS

U.S. Appl. No. 12/060,653, filed in the name of Alexei Ashikhmin et al. on Apr. 1, 2008 and entitled "Fast Seamless Joining of Channels in a Multi-channel Communication System."

* cited by examiner

*Primary Examiner*—Chi H Pham
*Assistant Examiner*—Fan Ng
(74) *Attorney, Agent, or Firm*—Ryan, Mason & Lewis, LLP

(57) ABSTRACT

A multi-channel processing module is arranged in series with multiple channels of a communication system. The processing module synchronizes downstream symbols among the channels, and synchronizes downstream symbols for at least a given one of the channels with upstream symbols for that channel. The synchronization of downstream symbols among the channels and the synchronization of downstream symbols for at least the given channel with upstream symbols for that channel are collectively achieved by adjusting downstream and upstream adjustable delay elements associated with respective downlink and uplink signal paths in the multi-channel processing module. The channels may comprise respective subscriber lines of a DSL communication system.

20 Claims, 6 Drawing Sheets

METHODS AND APPARATUS FOR PROVIDING SYNCHRONIZATION IN A MULTI-CHANNEL COMMUNICATION SYSTEM

FIELD OF THE INVENTION

The present invention relates generally to communication systems, and more particularly to techniques for providing synchronization between communication channels in such systems so as to facilitate effective estimation and cancellation of crosstalk.

BACKGROUND OF THE INVENTION

As is well known, a communication system may utilize multiple communication channels to communicate signals between transmitters and receivers of the system. For example, multiple channels may be used to separate different transmitted data signals from one another, or to provide an increased data rate.

A problem that can arise in multiple channel communication systems relates to crosstalk between the various channels, also referred to as inter-channel crosstalk. For example, digital subscriber line (DSL) broadband access systems typically employ discrete multi-tone (DMT) modulation over twisted-pair copper wires. One of the major impairments in such systems is crosstalk between multiple subscriber lines within the same binder or across binders. Thus, a transmission on one subscriber line may be detected on other subscriber lines, leading to interference that can degrade the throughput performance of the system. More generally, a given "victim" channel may experience crosstalk from multiple "disturber" channels, again leading to undesirable interference.

Dynamic spectrum management (DSM) techniques have been developed in order to combat interference and to maximize the effective throughput and reach of a DSL system. Lower level DSM techniques, commonly referred to as Level 1 and Level 2 techniques, generally adjust the power levels associated with a given subscriber line in an attempt to minimize interference. Level 3 techniques are more sophisticated, and allow active cancellation of inter-channel crosstalk through the use of a precoder. To simplify the operation of the precoder and to increase its effectiveness, it is beneficial if the various subscriber lines involved are fully synchronized.

Conventional systems fail to provide adequate arrangements for multi-channel synchronization, and thus are unable to obtain the full benefits associated with higher level DSM techniques. For example, in many such systems, the various DSL lines do not originate from a common board or card, and thus do not share a common transmit clock.

Accordingly, a need exists for an improved technique for providing synchronization in a multi-channel communication system.

SUMMARY OF THE INVENTION

The present invention in one or more illustrative embodiments provides techniques for synchronizing two or more channels of a multi-channel communication system at a symbol level. The channels may be, for example, subscriber lines of a DSL system, and the symbols may be DMT symbols transmitted over those subscriber lines.

In accordance with one aspect of the invention, a multi-channel processing module is arranged in series with multiple channels of a communication system. The processing module synchronizes downstream symbols among the channels, and synchronizes downstream symbols for at least a given one of the channels with upstream symbols for that channel. The synchronization of downstream symbols among the channels and the synchronization of downstream symbols for at least the given channel with upstream symbols for that channel are collectively achieved by adjusting downstream and upstream adjustable delay elements associated with respective downlink and uplink signal paths in the multi-channel processing module.

In an illustrative embodiment, the symbols are synchronized relative to a common reference shared by the channels. The common reference comprises a common time reference having pulses which occur at intervals given by $S=N+G$, where S denotes the symbol length, N denotes the length of an information-carrying part of the symbol, and G denotes the cyclic extension length. The multi-line processing module in this embodiment sets delays of the downstream and upstream adjustable delay elements for a given one of the channels such that a round-trip delay for that channel is approximately given by an integer multiple of the symbol length $S=N+G$.

The disclosed techniques can be implemented in a wide variety of wired or wireless communication systems, including DSL systems and cellular systems.

Advantageously, the illustrative embodiments can provide symbol level synchronization of multiple channels in upstream and downstream directions. This considerably facilitates the use of precoding, while also enhancing its effectiveness, resulting in improved system performance in the presence of inter-channel crosstalk.

These and other features and advantages of the present invention will become more apparent from the accompanying drawings and the following detailed description.

DETAILED DESCRIPTION OF THE INVENTION

The present invention will be illustrated below in conjunction with exemplary communication systems and associated techniques for achieving synchronization between subscriber lines or other communication channels in such systems. It should be understood, however, that the invention is not limited to use with the particular types of communication system or synchronization techniques disclosed. The invention can be implemented in a wide variety of other communication systems, and in numerous alternative multi-channel synchronization applications. For example, although illustrated below in the context of DSL systems based on DMT modulation, the disclosed techniques can be adapted in a straight-forward manner to other types of wired or wireless communication systems, including cellular systems, multiple-input multiple-output (MIMO) systems, Wi-Fi or WiMax systems, etc.

Figure 1:
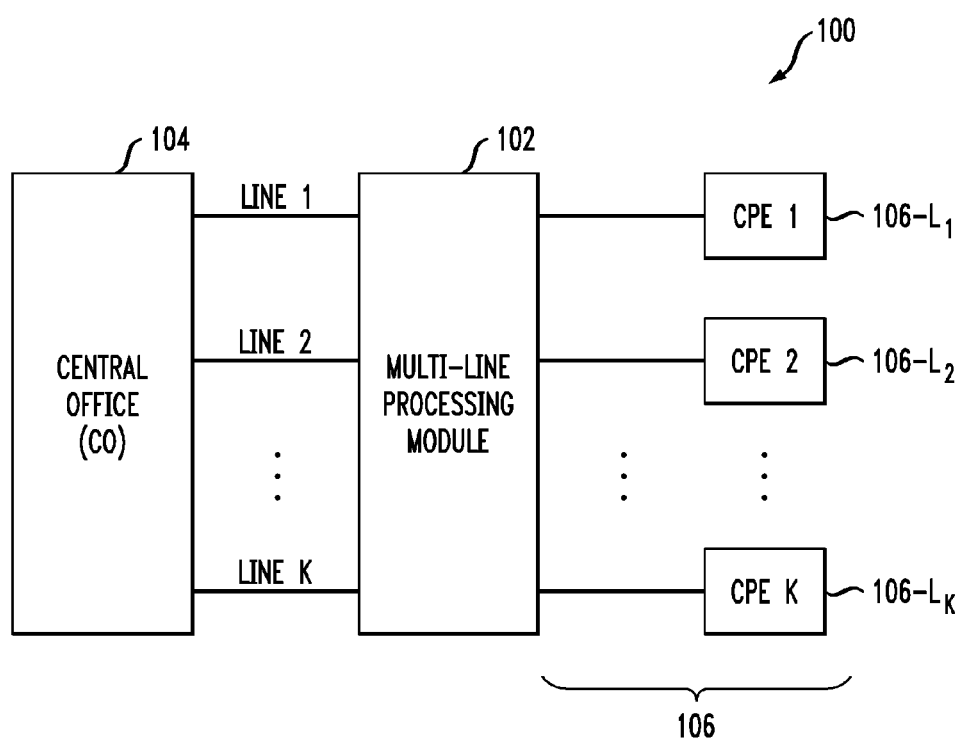
FIG. 1 is a block diagram of a multi-channel communication system in an illustrative embodiment of the invention.

FIG. 1 shows a communication system 100 comprising a multi-line processing module 102 arranged between a central office (CO) 104 and customer premises equipment (CPE) 106. The CPE 106 more particularly comprises K distinct CPE elements that are individually denoted CPE 1, CPE 2, ... CPE K, and are further identified by respective reference numerals 106-$L_1$, 106-$L_2$, ... 106-$L_K$ as shown. A given CPE element may comprise, by way of example, a modem, a computer, or other type of communication device, or combinations of such devices. The CO 104 is coupled to these CPE elements via respective subscriber lines denoted Line 1, Line 2, ... Line K, each of which may comprise, for example, a twisted-pair copper wire connection. The lines Line 1, Line 2, ... Line K, are also denoted elsewhere herein as lines $L_1$, $L_2$, ... $L_K$, respectively.

Although illustratively shown as being separate from the CO 104 in FIG. 1, the multi-line processing module 102 may be incorporated into the CO itself. For example, the multi-line processing module may comprise a DSL access multiplexer (DSLAM) suitably modified so as to incorporate synchronization techniques as disclosed herein, or it may comprise a separate hardware module that incorporates such techniques and is coupled to an otherwise conventional DSLAM. Typically, such a DSLAM would be located internal to the CO. Thus, module 102 can be integrated into or coupled to a DSLAM that is part of the CO 104.

It may be assumed that the K lines in FIG. 1 originate, for example, from different boards or cards within the CO 104, and accordingly do not share any common transmit clock. This lack of synchronization is addressed and overcome by the techniques described herein.

Communications between the CO 104 and the CPE 106 include both downstream and upstream communications. The downstream direction refers to the direction from CO to CPE, and the upstream direction is the direction from CPE to CO. Although not explicitly shown in FIG. 1, it is assumed without limitation that there is associated with each of the subscriber lines of system 100 a CO transmitter and a CPE receiver for use in communicating in the downstream direction, and a CPE transmitter and a CO receiver for use in communicating in the upstream direction. The corresponding transmitter and receiver circuitry can be implemented in the CO and CPE using well-known conventional techniques, and accordingly will not be described in detail herein.

In an illustrative embodiment, DMT symbols are detected for each of the K lines in the system 100, and the symbols are synchronized among the K lines. Moreover, upstream and downstream communications are synchronized with one another for each of the K lines at the DMT symbol level. The term "synchronization" as used herein is intended to be construed broadly, so as to encompass, for example, an arrangement in which the DMT symbols on the K lines are substantially aligned so as to be sent at approximately the same time. In conventional systems, there is typically no such time alignment between the DMT symbols of the various subscriber lines.

It is to be appreciated that the particular number K of lines to be synchronized need not be all of the lines in the system. K may be viewed as taking on any desired value greater than or equal to two. A given system may comprise synchronized lines and unsynchronized lines. Thus, K may denote a subset of the total available lines in the system, with just this subset to be synchronized with one another. As another example, there may be multiple synchronization groups within a given system, with the particular lines in each group being synchronized with one another using the techniques disclosed herein.

Figure 2:
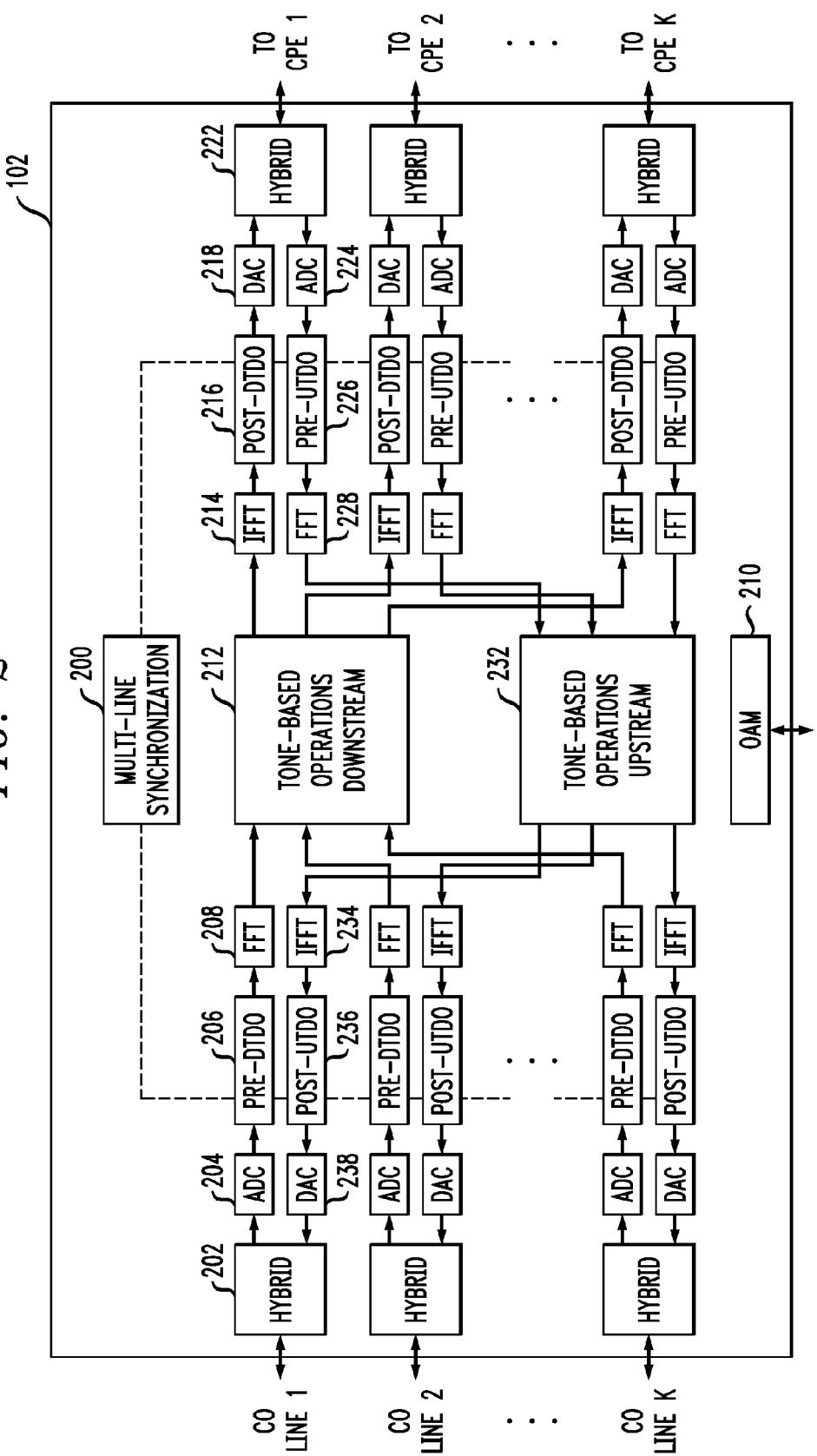
FIG. 2 shows a more detailed view of one possible embodiment of a multi-line processing module of the FIG. 1 system.

FIG. 2 shows one possible embodiment of the multi-line processing module 102 in greater detail. This embodiment is generally configured for arrangement external to a conventional DSLAM. Thus, the module 102 in this embodiment serves to allow DSM Level 3 techniques to be implemented in the conventional DSLAM. As mentioned previously, other embodiments may incorporate portions of the synchronization process into the DSLAM itself, for example, in an embodiment in which preceding is done in multiple DSLAM chips on multiple boards or cards in the CO 104.

The module 102 as shown in FIG. 2 includes a multi-line synchronization (MLS) module 200. A given downstream signal from CO 104 is applied via a hybrid 202 to an analog to digital converter (ADC) 204. The hybrid may be, for example, a splitter, diplexer, coupler or other passive element. The ADC samples the incoming downstream signal using a sampling clock that may be provided from a DSLAM or regenerated using a clock recovery module. The ADC is followed by a pre-DTDO module 206 that performs downstream time-domain operations (DTDO). The "pre" indicates that the associated operations are performed prior to a fast Fourier transform (FFT) that is implemented in 208. Each of the pre-DTDO modules 206 may comprise, for example, one or more first-in first out (FIFO) buffers that serve as adjustable delay elements, as well as a cyclic extension (CE) detector which performs a correlation operation on the downstream time-domain signal to detect the cyclic extension of a given DMT symbol. A more particular example of such a detector will be further described below in conjunction with FIG. 4. Once the location of the cyclic extension has been determined, it can be removed to obtain information-carrying parts of the time-domain DMT symbols.

The MLS module 200 may be configured to provide synchronization among the multiple lines by controlling the delays introduced by the FIFO buffers of the respective pre-DTDO modules 206. This allows an appropriate timing advance to be set for each line so as to align the downlink signals of the respective lines relative to a common time reference. As a more particular example, these various timing advances may be set such that DMT symbols from the individual lines are read synchronously from their respective FIFO buffers and are fed substantially simultaneously into the corresponding FFT modules 208.

The MLS module 200 may interact with the CO 104 to set or adjust a timing advance for each line. This interaction may occur through an interface element 210 associated with otherwise conventional operations, administration and management (OAM) infrastructure of the system.

The downstream timing advances referred to above provide synchronization among the K lines at a DMT symbol level at the output of the multi-line processing module 102. The illustrative embodiments can also be configured to provide synchronization of the downlink and uplink signals associated with a given one of the lines, as will be described below in conjunction with FIG. 4.

Subsequent to the FFT performed in module 208, tone-based downstream operations are performed in module 212, followed by an inverse FFT (IFFT) in module 214, additional DTDO in post-DTDO module 216, and finally conversion back to digital in a digital to analog converter (DAC) module 218. The resulting analog signal is delivered via hybrid 222 to CPE 1 as indicated.

In the upstream direction, operations complementary to those performed in the downstream direction are performed utilizing ADC module 224, pre-UTDO module 226, FFT module 228, tone-based operations upstream module 232, IFFT module 234, post-UTDO module 236, and DAC module 238. The resulting analog signal is delivered via hybrid 202 to the CO 104 as indicated.

Similar downstream and upstream operations occur for each of the other K signal lines as indicated in the figure.

Figure 3:
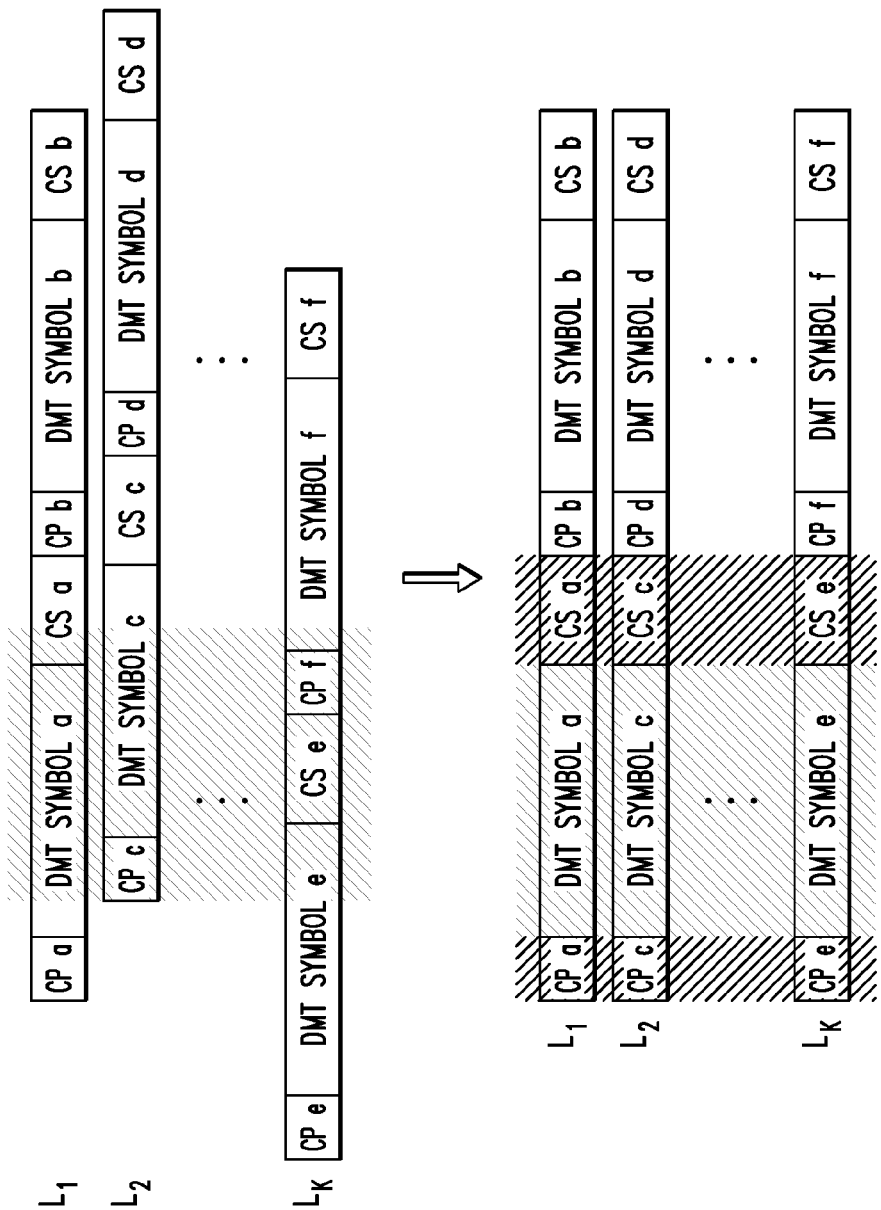
FIG. 3 is a diagram illustrating relative positions of DMT symbols associated with K unsynchronized lines and the relative positions of the corresponding aligned DMT symbols after synchronization in the FIG. 2 module.

FIG. 3 illustrates the manner in which the K lines $L_1$ through $L_K$ may be synchronized using the multi-line processing module 102. The upper part of FIG. 3 shows the lines prior to synchronization. This part of the figure may be viewed as a time-domain representation of the downstream signals at the corresponding inputs to the multi-line processing module 102. Each of the DMT symbols a, b, c, d, e, f, etc. in this example has an associated cyclic extension which comprises both a cyclic prefix (CP) and a cyclic suffix (CS). Of course, other embodiments may utilize other types of cyclic extensions, such as ones that appear only at the beginning or only at the end of a given symbol. It should be noted that a given DMT symbol is assumed for purposes of the illustrative embodiment to include both an information-carrying part and the cyclic extension. The lower part of the figure shows the situation after multi-line synchronization, illustrating the time-domain representation of the aligned downstream signals at the corresponding outputs of the multi-line processing module. It can be seen that the K lines in this example are synchronized with one another at a DMT symbol level.

Figure 4:
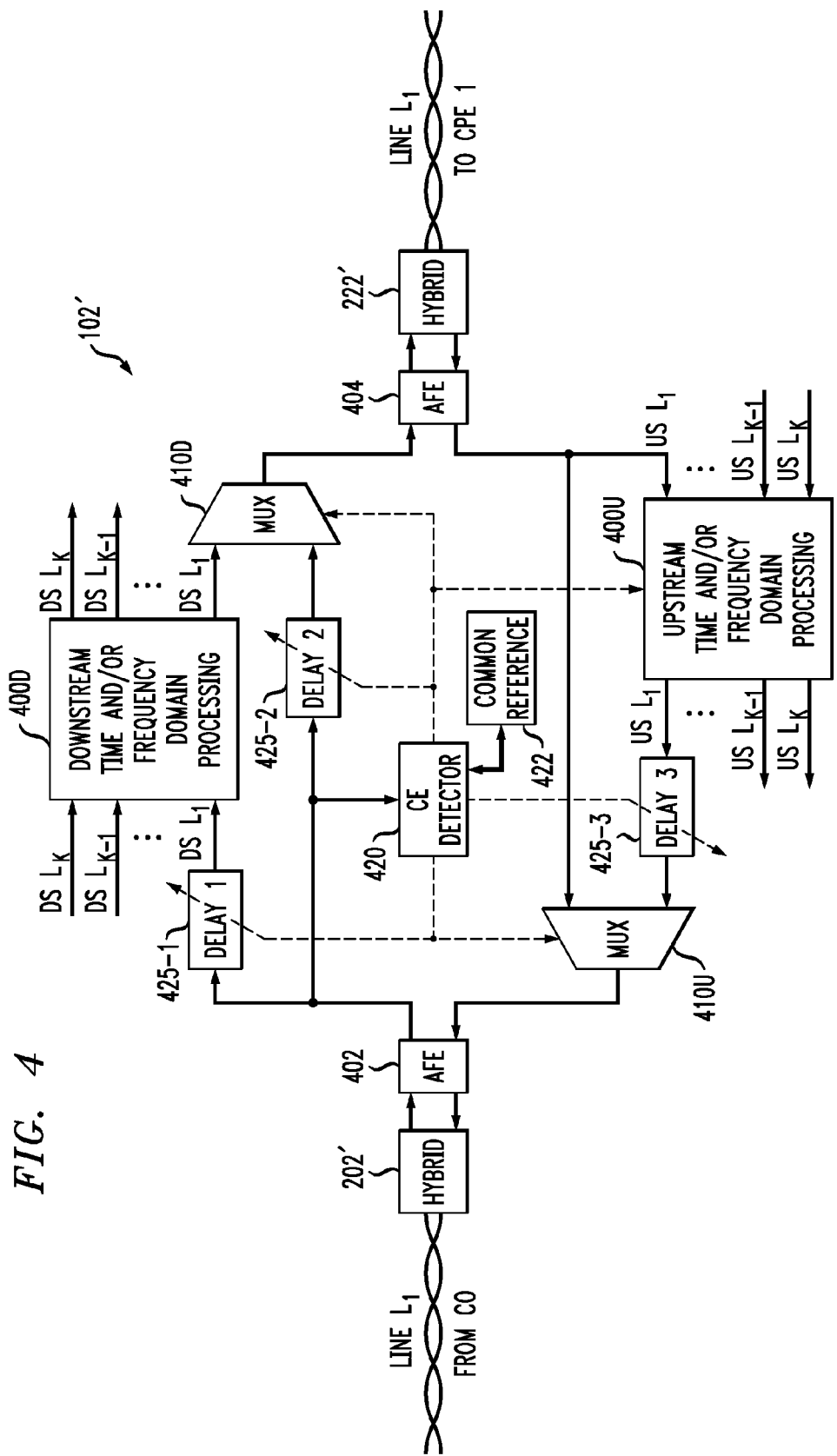
FIG. 4 shows another illustrative embodiment of the multi-line processing module of the FIG. 1 system.

Referring now to FIG. 4, another embodiment of the multi-line processing module 102 is shown. This embodiment corresponds generally to the embodiment of FIG. 2, and operates in a similar manner, but is nonetheless more specifically designated as module 102' in FIG. 4. It provides synchronization among multiple lines as well as synchronization between downlink and uplink of a given line, as will be described. The module 102' comprises downstream processing element 400D and upstream processing element 400U, which may comprise portions of the respective downstream and upstream processing elements of FIG. 2, such as downstream elements 206, 208, 212, 214 and 216, and upstream elements 226, 228, 232, 234 and 236. The processing elements 400D and 400U may thus perform time and/or frequency domain processing operations on respective downstream and upstream signals.

The module 102' is interfaced to the CO 104 via hybrid 202' and analog front end (AFE) 402. Similarly, the module 102' is interfaced to CPE 1 via hybrid 222' and AFE 404. The AFE 402 comprises ADC 204 and DAC 238, while the AFE 404 comprises DAC 218 and ADC 224. Although not explicitly shown in FIG. 4, similar hybrid and AFE elements, as well as other elements, will be associated with each of the K-1 other lines processed by the module 102' as in the FIG. 2 embodiment.

The module 102' as shown further comprises a downstream multiplexer 410D, an upstream multiplexer 410U, a CE detector 420, a common reference 422, and adjustable delay elements 425-1, 425-2 and 425-3, which provide configurable amounts of delay denoted Delay 1, Delay 2 and Delay 3, respectively. The adjustable delay elements 425 may each be implemented, for example, as a corresponding FIFO buffer of the type previously described. Although only a single set of elements 410, 420 and 425 is shown in the figure, for use with Line $L_1$, the module 102' will also include an additional set of such elements for each of the other K-1 lines. However, the common reference 422 is shared by all K of the lines processed by the module 102'.

The common reference 422 in the present embodiment is a common time reference that produces a pulse at constant intervals corresponding generally to the combined length of the information-carrying part of the DMT symbol and its cyclic extension. The respective lengths of the information-carrying part of the DMT symbol and its cyclic extension are denoted herein as N and G. Thus, the common reference produces pulses at intervals given by S=N+G, where S denotes the symbol length. The length of the cyclic extension in the illustrative embodiments is assumed to be the length of the cyclic prefix plus the length of the cyclic suffix. The reference element 422 can be autonomous, for example, derived in a straightforward manner from a local reference clock, or alternatively can be controlled responsive to a first active line in the system, such as the line $L_1$ or any other particular line. In the latter case, the resulting common reference should not continue to depend from the line from which it was derived, in case that line has a failure.

It should be noted that the position of the adjustable delay elements may be varied in other embodiments. By way of example, the downstream delay elements 425-1 and 425-2 may be implemented as part of a given pre-DTDO module 206 or post-DTDO module 216, while the upstream delay element 425-3 may be implemented as part of a given pre-UTDO module 226 or post-UTDO module 236. As another example, one or more of these delay elements may be implemented externally to those particular modules.

At initialization, the downstream and upstream processing elements 400D and 400U are first bypassed via respective multiplexers 410D and 410U under the control of the CE detector 420. The delay Delay 2 provided by adjustable delay element 425-2 is chosen such that a given round-trip delay is an integer multiple of S=N+G. In this bypass configuration, the CE detector 420 correlates samples of the incoming signal with buffered samples at delay N to determine the cyclic extension. The CE detector is typically able to determine the location of the DMT symbols after having received a sequence of samples corresponding to a small number of DMT symbols at or near the start of a training phase, which may be indicated, for example, by a second silent period of the CPE after a handshake phase. See ITU-T Recommendation G.994.1, "Handshake procedures for digital subscriber line (DSL) transceivers," February 2007, which is incorporated by reference herein.

Similar operations are performed for each of the other lines using their respective adjustable delays Delay 2 in order to detect cyclic extensions in their respective downlink signals.

After the training phase starts, it is possible to adjust the downlink and uplink delays within each channel as the CPE is still trying to recover the symbol boundaries. These delay adjustments are made using the adjustable delays Delay 1 and Delay 3 so as to achieve synchronization among the multiple lines as well as synchronization between the downlink and uplink signals of one or more of the lines. During this time period, the downstream and upstream processing elements 400D and 400U are switched back into the downstream and upstream signal paths via respective multiplexers 410D and 410U, and the delays Delay 1 and Delay 3 provided by the adjustable delay elements 425-1 and 425-3 are set such that the downlink and uplink DMT symbols of the corresponding line are suitably aligned with the common reference and further that the round-trip delay is an integer multiple of S=N+G. Again, similar operations are performed for each of the other lines using their respective adjustable delays Delay 1 and Delay 3 in order to provide synchronization among the multiple lines as well as synchronization of the downlink and uplink signals for that line.

Although the module 102' as shown in FIG. 4 includes a CE detector for the downstream direction only, other embodiments of this module may also include a corresponding CE detector for the upstream direction, along with one or more corresponding delay elements to adjust the alignment in the upstream.

Also, in addition to CE detection, the module 102' may be configured to provide monitoring of drift or jitter in one line relative to another. Suitable delay adjustments may be made periodically responsive to such monitoring. The module 102' may further be configured in a straightforward manner to accommodate periodic resynchronizations.

Figure 5:
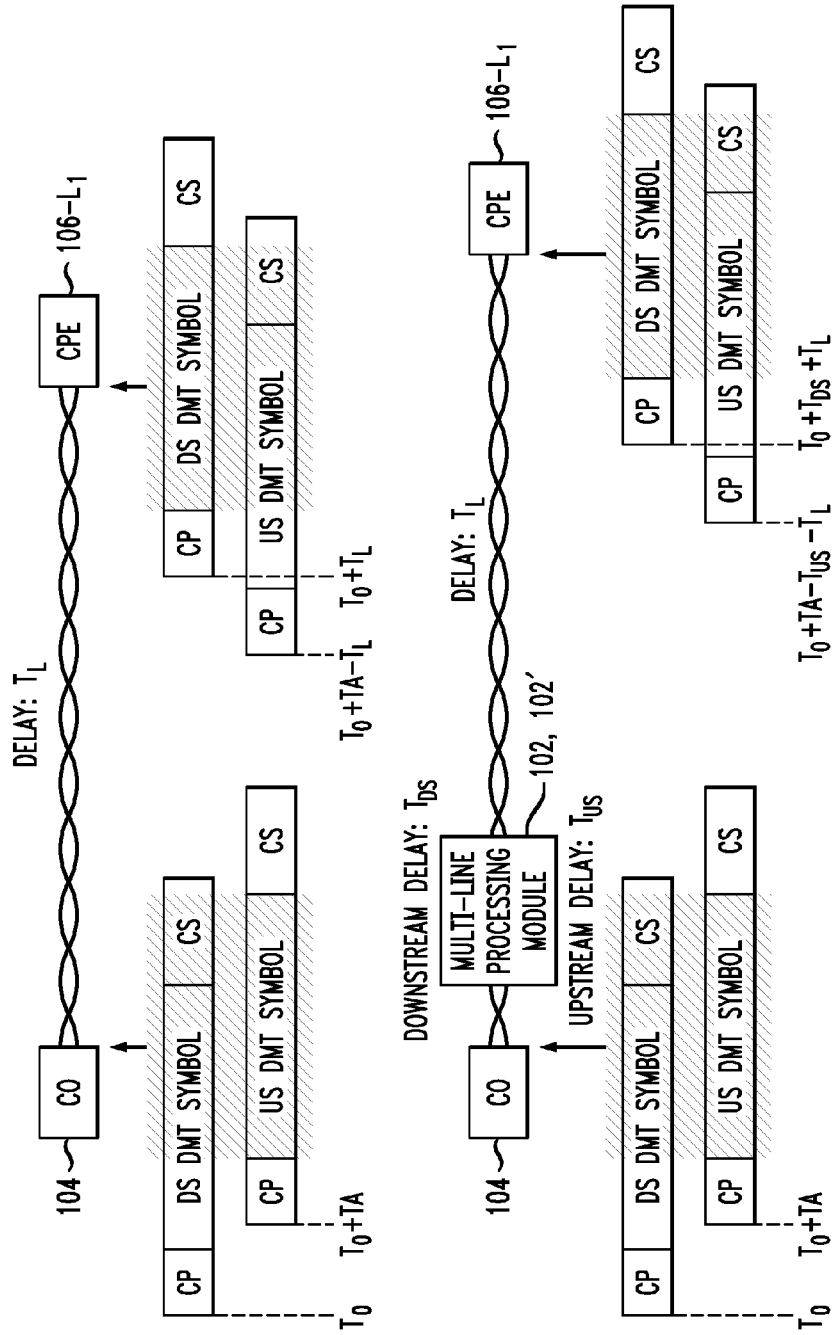
FIG. 5 shows an exemplary alignment of DMT symbols in upstream and downstream directions in an illustrative embodiment.

FIG. 5 shows the relative timing advance needed to align DMT symbols in the upstream and downstream directions for the first line $L_1$. In this diagram, $T_L$ denotes the line delay from the CO 104 to the first CPE 106-$L_1$, $T_0$ denotes the common reference, and TA denotes the timing advance. Orthogonality of the upstream and downstream signals is considered to be maintained as long as $T_L \leq TA_{max}$. The lower part of the figure shows the change in time delay when the multi-line processing module introduces additional downstream and upstream delays given by $T_{DS}$ and $T_{US}$, respectively. The adjustable delays Delay1 and Delay 3 are selected such that:

$$(T_0+TA-T_L-T_0-T_L) \text{modulo}(N+G) = (T_0+TA-T_{US}-T_L-T_0-T_{DS}-T_L) \text{modulo}(N+G),$$

which can also be expressed as:

$$T_{DS}+T_{US}=n(N+G),$$

where n denotes a positive integer.

Figure 6:
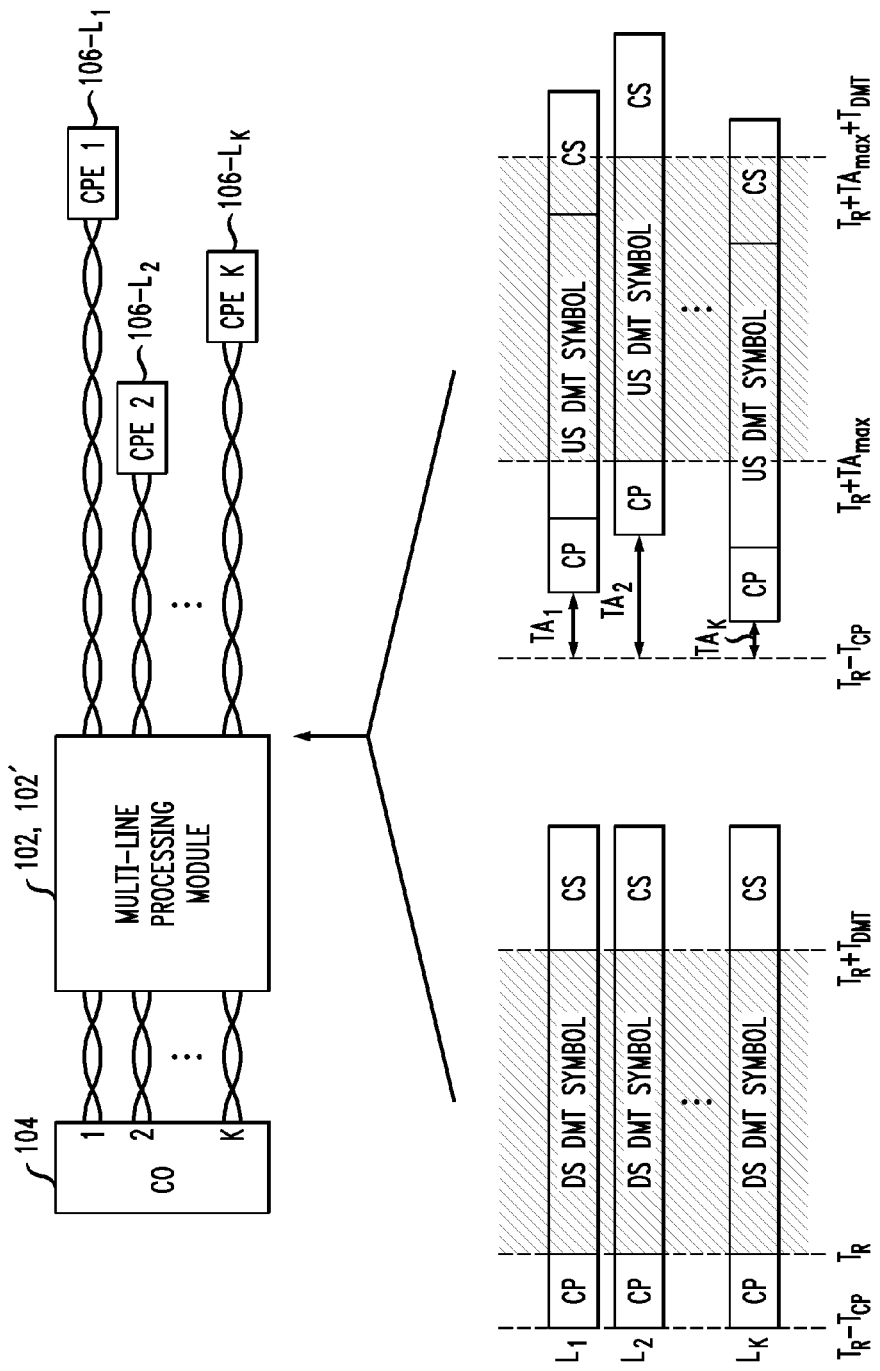
FIG. 6 illustrates the operation of an embodiment configured to align DMT symbols for a system with different line lengths.

FIG. 6 illustrates multi-line synchronization in an embodiment in which the line lengths between the CO 104 and respective ones of the CPE elements 106 have different lengths. In this figure, $T_R$ denotes a reference time, $T_{CP}$ denotes the duration of the cyclic prefix, $T_{DMT}$ denotes the duration of the DMT symbol, and $TA_1$ through $TA_K$ denote the timing advances associated with lines $L_1$ through $L_K$, respectively. The upper part of the figure shows the system with different line lengths. The lower part of the figure indicates that when the downstream signals on the left side have been synchronized to reference time $T_R$ at the output of the multi-line processing module as shown, the corresponding upstream signals on the right side will be sufficiently aligned within a maximum timing advance $TA_{max}$. Thus, substantially simultaneous processing of the upstream signals for the K lines can be achieved by appropriate selection of a window for performing FFT operations in FFT elements 228.

The above-described illustrative embodiments provide a number of significant advantages relative to conventional techniques. For example, the illustrative embodiments can provide symbol level synchronization of multiple channels in upstream and downstream directions. This considerably facilitates the use of precoding, while also enhancing its effectiveness, resulting in improved system performance in the presence of inter-channel crosstalk. Also, these embodiments can be implemented in an otherwise conventional DSLAM, or as a separate multi-line processing module coupled to a conventional DSLAM, and generally operate in a manner consistent with existing DSL standards.

Any of a wide variety of known preceding techniques may be used to implement crosstalk cancellation for multiple lines that are synchronized in the manner disclosed herein. Such precoding techniques are well understood by those skilled in the art and therefore will not be described in detail. Generally, preceding is used for downstream transmissions. However, having synchronized lines as disclosed herein is also beneficial for crosstalk compensation in the upstream direction, and such compensation may be implemented, for example, in modules 102 or 102' or in a corresponding DSLAM.

The above-described embodiments may perform synchronization in conjunction with a joining algorithm, such as that described in U.S. patent application Ser. No. 12/060,653, filed Apr. 1, 2008 and entitled "Fast Seamless Joining of Channels in a Multi-Channel Communication System," which is commonly assigned herewith and incorporated by reference herein.

Embodiments of the present invention may be implemented at least in part in the form of one or more software programs or other types of executable program code that are stored in a memory or other processor-readable medium of a multi-line processing module or other processing device. Of course, numerous alternative arrangements of hardware, software or firmware in any combination may be utilized in implementing a multi-line processing module in accordance with the invention.

It should again be emphasized that the embodiments described above are presented by way of illustrative example only. Other embodiments may use different communication system configurations, transmitter and receiver configurations, communication channels, and multi-line synchronization processing operations, depending on the needs of the particular communication application.

For example, although the illustrative embodiments utilize symbols having a cyclic extension with prefix and suffix portions, other embodiments may be configured to process symbols with other types of cyclic extensions.

As another example, the particular manner in which additional delays are introduced in downlink or uplink signals for purposes of synchronization among multiple lines or synchronization of downlink and uplink within a given line may be varied in alternative embodiments.

It should also be noted that the particular assumptions made in the context of describing the illustrative embodiments should not be construed as requirements of the invention. The invention can be implemented in other embodiments in which these particular assumptions do not apply.

These and numerous other alternative embodiments within the scope of the appended claims will be readily apparent to those skilled in the art.

What is claimed is:

1. A method of synchronizing a plurality of communication channels of a communication system, the method comprising the steps of:

synchronizing downstream symbols among the plurality of channels; and synchronizing downstream symbols for at least a given one of the channels with upstream symbols for that channel;

wherein the synchronizing steps collectively comprise adjusting downstream and upstream adjustable delay elements associated with respective downlink and uplink signal paths, for each of two or more of the channels, in a multi-channel processing module arranged in series with the plurality of channels; and wherein the symbols of a given one of the channels are detected by detecting an associated cyclic extension in a bypass configuration in which downstream and upstream processing elements associated with the given channel are bypassed.

2. The method of claim 1 wherein the communication system comprises a DSL system and the channels correspond to respective subscriber lines of the DSL system.

3. The method of claim 1 wherein the synchronizing steps comprise synchronizing the symbols relative to a common reference shared by the channels.

4. The method of claim 3 wherein the common reference comprises a common time reference having pulses which occur at intervals given by N+G, where N denotes length of an information-carrying part of a symbol and G denotes length of a cyclic extension of the symbol.

5. The method of claim 1 wherein an additional adjustable delay element is controlled to facilitate detection of the cyclic extension.

6. An article of manufacture comprising a processor-readable non-transitory storage medium having embodied therein executable program instructions which when executed by a processor perform the steps of the method of claim 1.

7. An apparatus for use in synchronizing a plurality of channels of a communication system, the apparatus comprising:
a processing device implementing a multi-channel processing module arranged in series with each of the plurality of channels, the multi-channel processing module being configured to synchronize downstream symbols among the plurality of channels, and to synchronize downstream symbols for at least a given one of the channels with upstream symbols for that channel;
the multi-channel processing module comprising downstream and upstream adjustable delay elements associated with respective downlink and uplink signal paths for each of two or more of the channels;
wherein the multi-channel processing module synchronizes downstream symbols among the plurality of channels and synchronizes downstream symbols for at least a given one of the channels with upstream symbols for that channel by adjusting the downstream and upstream adjustable delay elements; and
wherein the symbols of a given one of the channels are detected by detecting an associated cyclic extension in a bypass configuration in which downstream and upstream processing elements associated with the given channel are bypassed.

8. The apparatus of claim 7 wherein the multi-channel processing module comprises a multi-line processing module associated with an access multiplexer of a DSL system.

9. The apparatus of claim 8 wherein the multi-line processing module is implemented within the access multiplexer.

10. The apparatus of claim 8 wherein the multi-line processing module is implemented as an external module coupled to the access multiplexer.

11. The apparatus of claim 8 wherein the multi-line processing module synchronizes the symbols relative to a common reference shared by the channels.

12. The apparatus of claim 11 wherein the common reference comprises a common time reference having pulses which occur at intervals given by N+G, where N denotes length of an information-carrying part of a symbol and G denotes length of a cyclic extension of the symbol.

13. A method of synchronizing a plurality of communication channels of a communication system, the method comprising the steps of:
synchronizing downstream symbols among the plurality of channels; and
synchronizing downstream symbols for at least a given one of the channels with upstream symbols for that channel;
wherein the synchronizing steps collectively comprise adjusting downstream and upstream adjustable delay elements associated with respective downlink and uplink signal paths, for each of two or more of the channels, in a multi-channel processing module arranged in series with the plurality of channels;
wherein the common reference comprises a common time reference having pulses which occur at intervals given by N+G, where N denotes length of an information-carrying part of a symbol and G denotes length of a cyclic extension of the symbol; and
wherein the synchronizing steps comprise setting delays of the downstream and upstream adjustable delay elements for a given one of the channels such that a round-trip delay for that channel is approximately given by an integer multiple of N+G.

14. A method of synchronizing a plurality of communication channels of a communication system, the method comprising the steps of:
synchronizing downstream symbols among the plurality of channels; and
synchronizing downstream symbols for at least a given one of the channels with upstream symbols for that channel;
wherein the synchronizing steps collectively comprise adjusting downstream and upstream adjustable delay elements associated with respective downlink and uplink signal paths, for each of two or more of the channels in a multi-channel processing module arranged in series with the plurality of channels;
wherein the common reference comprises a common time reference having pulses which occur at intervals given by N+G, where N denotes length of an information-carrying part of a symbol and G denotes length of a cyclic extension of the symbol; and
wherein the synchronizing steps comprise setting delays of the downstream and upstream adjustable delay elements for a given one of the channels such that a sum of a downstream delay $T_{DS}$ introduced by the downstream adjustable delay element and an upstream delay $T_{US}$ introduced by the upstream adjustable delay element is approximately given by an integer multiple of N+G.

15. A method of synchronizing a plurality of communication channels of a communication system, the method comprising the steps of:
synchronizing downstream symbols among the plurality of channels; and
synchronizing downstream symbols for at least a given one of the channels with upstream symbols for that channel;
wherein the synchronizing steps collectively comprise adjusting downstream and upstream adjustable delay elements associated with respective downlink and uplink signal paths, for each of two or more of the channels, in a multi-channel processing module arranged in series with the plurality of channels; and
wherein the downstream and upstream adjustable delay elements are implemented in respective pre-DTDO and pre-UTDO modules of a multi-line processing module of the communication system, where DTDO denotes downstream time-domain operations and UTDO denotes upstream time-domain operations.

16. An apparatus for use in synchronizing a plurality of channels of a communication system, the apparatus comprising:
a processing device implementing a multi-channel processing module arranged in series with each of the plurality of channels, the multi-channel processing module being configured to synchronize downstream symbols among the plurality of channels, and to synchronize downstream symbols for at least a given one of the channels with upstream symbols for that channel;
the multi-channel processing module comprising downstream and upstream adjustable delay elements associated with respective downlink and uplink signal paths for each of two or more of the channels;

wherein the multi-channel processing module synchronizes downstream symbols among the plurality of channels and synchronizes downstream symbols for at least a given one of the channels with upstream symbols for that channel by adjusting the downstream and upstream adjustable delay elements;

wherein the common reference comprises a common time reference having pulses which occur at intervals given by N+G, where N denotes length of an information-carrying part of a symbol and G denotes length of a cyclic extension of the symbol; and wherein the multi-channel processing module is configured to set delays of the downstream and upstream adjustable delay elements for a given one of the channels such that a round-trip delay for that channel is approximately given by an integer multiple of N+G.

17. An apparatus for use in synchronizing a plurality of channels of a communication system, the apparatus comprising;

a processing device implementing a multi-channel processing module arranged in series with each of the plurality of channels, the multi-channel processing module being configured to synchronize downstream symbols among the plurality of channels and to synchronize downstream symbols for at least a given one of the channels with upstream symbols for that channel;

the multi-channel processing module comprising downstream and upstream adjustable delay elements associated with respective downlink and uplink signal paths for each of two or more of the channels;

wherein the multi-channel processing module synchronizes downstream symbols among the plurality of channels and synchronizes downstream symbols for at least a given one of the channels with upstream symbols for that channel by adjusting the downstream and upstream adjustable delay elements; and wherein the downstream and upstream adjustable delay elements are implemented in respective pre-DTDO and pre-UTDO modules of the multi-line processing module, where DTDO denotes downstream time-domain operations and UTDO denotes upstream time-domain operations.

18. A communication system, comprising:

a first transceiver;

a plurality of additional transceivers configured to communicate with the first transceiver over respective ones of a plurality of communication channels; and a multi-channel processing module coupled between the first transceiver and the plurality of additional transceivers in series with each of the plurality of channels;

the multi-channel processing module being configured to synchronize downstream symbols among the plurality of channels, and to synchronize downstream symbols for at least a given one of the channels with upstream symbols for that channel;

the multi-channel processing module comprising downstream and upstream adjustable delay elements associated with respective downlink and uplink signal paths for each of two or more of the channels;

wherein the multi-channel processing module synchronizes downstream symbols among the plurality of channels and synchronizes downstream symbols for at least a given one of the channels with upstream symbols for that channel by adjusting the downstream and upstream adjustable delay elements; and wherein the symbols of a given one of the channels are detected by detecting an associated cyclic extension in a bypass configuration in which downstream and upstream processing elements associated with the given channel are bypassed.

19. The communication system of claim 18 wherein the first transceiver comprises a central office of a DSL system.

20. The communication system of claim 18 wherein the additional transceivers comprise respective customer premises equipment elements of a DSL system.

* * * * *